April 15, 1952     J. G. THOMAS     2,592,976
PLANT-GROWING APPARATUS

Filed Feb. 14, 1948     2 SHEETS—SHEET 1

Inventor
Joseph G. Thomas
Alfred R. Fuchs
Attorney

April 15, 1952        J. G. THOMAS        2,592,976
PLANT-GROWING APPARATUS
Filed Feb. 14, 1948        2 SHEETS—SHEET 2
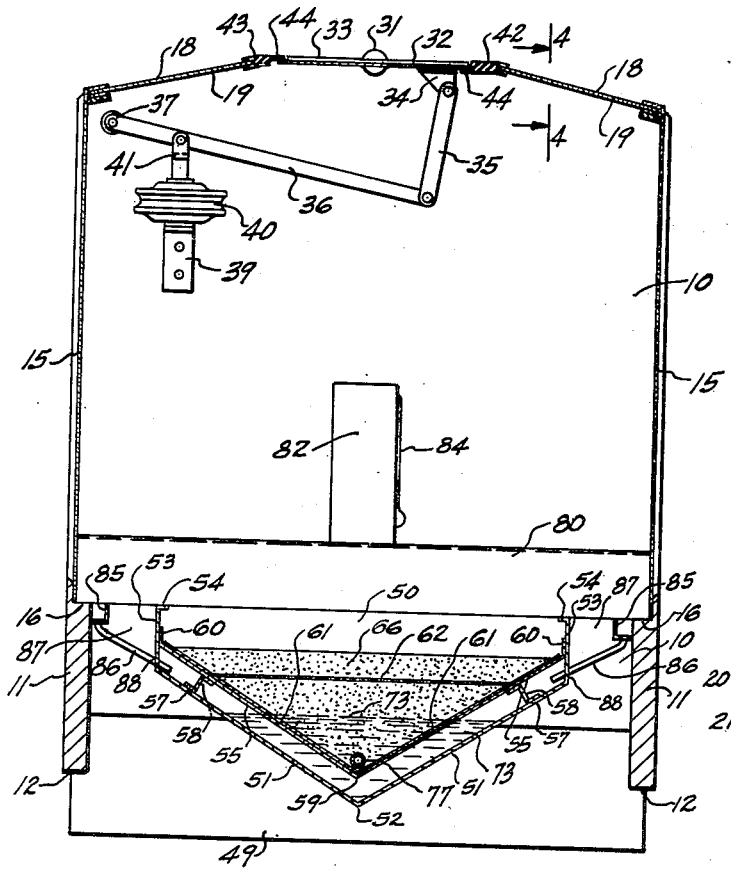
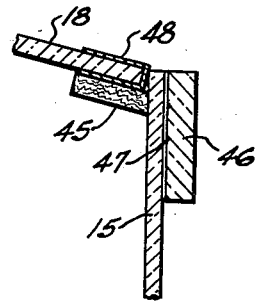
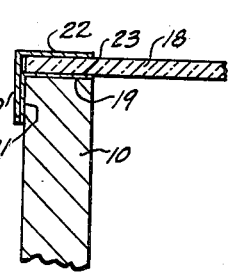
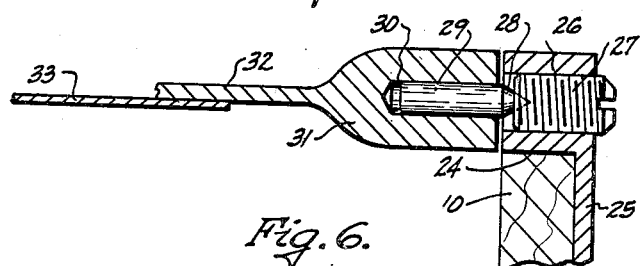
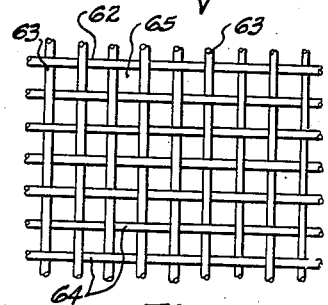
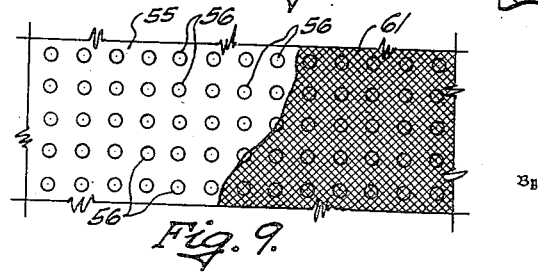
Inventor
Joseph G. Thomas
Alfred R. Fuchs
Attorney Patented Apr. 15, 1952

2,592,976

UNITED STATES PATENT OFFICE 2,592,976

PLANT-GROWING APPARATUS

Joseph G. Thomas, Lebanon, Mo., assignor of one-half to Benjamin F. Krehbiel, Wichita, Kans.

Application February 14, 1948, Serial No. 8,425

18 Claims. (Cl. 47—1.2)

My invention relates to plant growing apparatus.

The principal purpose of my invention is to provide an enclosed chamber or space in which plants can be grown, that is provided with means for automatically growing plants under controlled conditions.

It is an important purpose of my invention to provide a chamber or enclosed space that is provided with all the essentials of plant production, supplying all said essentials in the exact amount and in the proper proportions in accordance with the need of the plants that are to be grown and to do this in such a precise manner by co-ordination of the different features of the apparatus that even orchids, gloxinias, and other rare and expensive plants can be grown by the automatic operation of the apparatus and properly cared for within said apparatus in the average residence.

One of the important features of my invention is to provide automatic means for growing and caring for plants, which will operate to properly care for and grow the plants while the persons that have the apparatus are absent, such as while vacationing.

More specifically my invention comprises a glassed-in housing that is provided with means for controlling the temperature therein and which is provided with suitable means for supporting and supplying nutritive material to the plants and at the same time providing the proper amount of moisture for the plants, including the necessary humidity in the air surrounding the same for proper growth thereof. To accomplish this water is supplied to the finely divided material that supports the plants, which is, preferably, sand, but could be loose soil, which water contains plant food in the form of the necessary chemical elements that are required for the proper growth of the plants that are to be grown. The chemicals added to the water and carried in solution in water to the plants may be varied in accordance with the requirements of the plants and in proportion to the need of the type of plants to be grown in the growing apparatus.

It is a specific purpose of my invention to provide means for supplying humidity to the air in a chamber of the above mentioned character and the requisite moisture and nutritive matter for the plants, as well as to supply the necessary warmth to have the desired growing temperature in the plant supporting medium, as well as of the air in the chamber by providing heating means in a body of water in the lower portion of the chamber, which is thermostatically controlled to maintain a predetermined temperature of said body of water, which by capillary action also warms the body of loose material, such as sand, in which the plants are grown, and by conduction to the air within the chamber also warms the air to the desired temperature.

It is a further purpose of my invention to provide means for returning any moisture that may be condensed on the walls of the chamber to the main body of water provided therein, which body of water contains the chemical plant food elements and is thus a solution of the chemicals that are provided for feeding the plants.

It is another purpose of my invention to provide means for providing communication between the outside air and the air within the chamber of the growing apparatus when the temperature of the air within said chamber reaches a predetermined maximum, said means being thermostatically controlled.

It is an important purpose of my invention to provide ventilation passages on opposite sides of the container for said body of water, leading into the chamber above said body of water, and to provide means for controlling the level of said body of water.

Other objects and advantages of my invention will appear as the description of the drawings proceeds. I desire to have it understood, however, that I do not intend to limit myself to the particular details shown or described, except as defined in the claims.

In the drawings:

Fig. 2 is a section thereof taken on the line 2—2 of Fig. 1.

Fig. 3 is a fragmentary vertical sectional view, on an enlarged scale, taken substantially on the line 3—3 of Fig. 1.

Fig. 4 is a fragmentary vertical sectional view through the upper end of one of the end walls of the chamber and a top wall portion, on an enlarged scale, taken substantially on the line 4—4 of Fig. 2.

Fig. 6 is a fragmentary vertical sectional view through one of the swivels for the movable top wall portion, showing a fragmentary portion of said top wall and a fragmentary portion of the end wall on which said top wall is swiveled, on an enlarged scale.

Fig. 8 is a fragmentary plan view of the coarse mesh screen provided in said apparatus, and Fig. 9 is a fragmentary plan view of a portion of the inner perforated wall of the water container, showing a fragmentary portion of the fine mesh screen mounted thereon.

Figure 1:
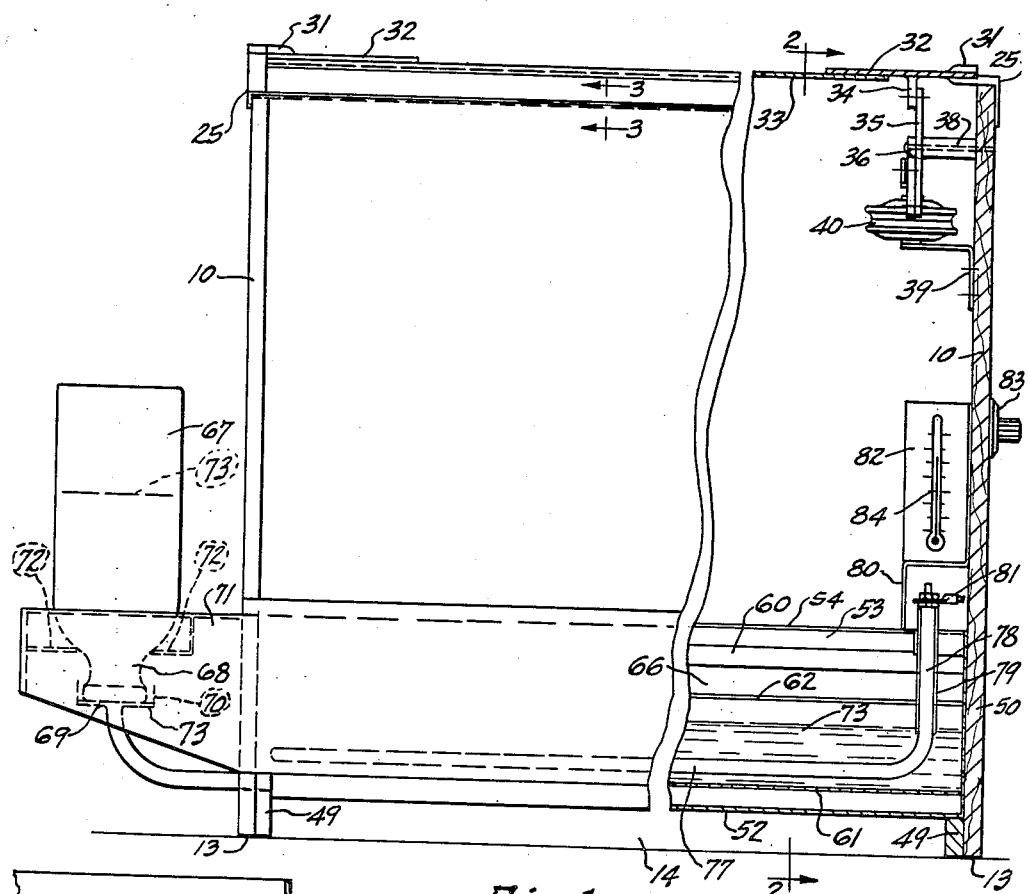
Fig. 1 is a view partly in elevation and partly in vertical section, a portion thereof being broken away, of my improved growing apparatus.
Figure 5:
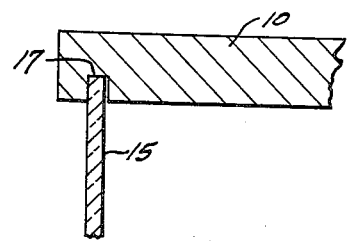
Fig. 5 is a fragmentary horizontal sectional view through one of said end walls, showing a portion of a side wall member associated therewith, on an enlarged scale.

Referring in detail to the drawings, my improved plant growing apparatus comprises a pair of end walls 10 that are connected by means of longitudinally extending frame members 11, which frame members 11 have their lower longitudinal edges 12 located a predetermined spaced distance above the bottom edges 13 of the end walls 10, thus providing longitudinally extending air inlet passages or slots 14 below the members 11, leading into the interior of the plant growing chamber. The side wall portions 15 of the chamber are made of a transparent material, preferably, glass, and engage the shoulders 16 provided on the frame members 11 in their lowermost positions. Said side wall members 15 are slidably mounted in grooves 17 in the end walls 10.

Also mounted on the end walls 10 are the fixed top wall portions 18, which are also of glass or other transparent material, and incline upwardly from the side walls 15, said end walls having inclined top edges 19 upon which the top wall members 18 are mounted. Instead of mounting the glass panes 18 directly on the top edges 19 of the end walls 10, these are, preferably, mounted in metallic frames made up of a pair of angle members 20 and 21 that have the flanges 22 and 23 thereof spaced from each other so as to provide a slot in which the marginal portion of the glass pane 18 is mounted.

The end walls 10 also have horizontally extending top edge portions 24 connecting the upper ends of the inclined edge portions 19, that have mounted substantially mid-way thereof brackets 25 that have internally screw-threaded socket portions 26 provided thereon, (see Fig. 6), in which the bearing members 27 in the form of set screws are screw-threadedly engaged, said bearing members having tapered openings in the inner ends thereof in which the tapered ends 28 of the pivot pins 29 are mounted for swivelling therein. The pivot pins 29 are fixed in openings 30 in the socket members 31, which are provided on the plates 32 that have secured thereto a glass or other transparent panel 33. One of the plates 32 has a depending ear 34, which has a link 35 pivoted thereto, the other end of which is pivoted to a lever 36 that is mounted on a suitable pivot 37 extending from one of the end walls 10, a spacing sleeve 38 being mounted between the lever 36 and the end wall 10. Said end wall also has a bracket 39 thereon that carries an expansible bellows 40, which has an upwardly extending arm 41 thereon that is pivotally connected with the lever 36. Said bellows is so constructed and arranged that it expands to raise the lever 36 and thus the right hand side of the plate 32 and with it the glass pane 33 and the plate 32 at the opposite end of said glass pane to open the ventilating member comprising said glass pane and metal plates 32.

The inner longitudinal edges of the glass top wall members 18 are provided with strips of cushioning material 42 and 43, which are grooved to receive the edges of the panes 18, the member 42 having a lip 44 that underlaps the edges of the plates 32 and the glass pane 33 so as to provide a seal between the right hand edges of said members 32 and 33 and said strip 42, as viewed in Fig. 2, while the member 43 has a lip 44 that similarly overlaps the edges of the members 32 and 33 to provide a seal along the left hand edges of the members 32 and 33. It will be obvious that as the temperature of the air in the chamber within the growing apparatus rises above a predetermined temperature, the bellows 40 will expand so as to raise the link 36 and open the ventilating means comprising the members 32 and 33, and that the amount of opening will depend upon the effect that the rise in temperature will have on the expansible bellows 40, the same expanding proportionately to the increase in temperature above a predetermined point.

A seal is also provided between the top wall forming members 18 and the side walls 15. Said side walls are slidable in the slots 17 to obtain access to the interior of the chamber provided in my growing apparatus, but inasmuch as it is desired to maintain and control closely temperatures within the apparatus when the walls 15 are in closed position, sealing means is provided between the top walls 18 and said side walls comprising the felt or similar compressible material strips 45, which are secured adhesively to the lower faces of the top wall forming members 18 and are slidably engaged by the wall forming members 15. Means is provided for collapsing the side walls 15 to move the same up and down, comprising handle members, such as the blocks 46, which are secured by suitable means, such as an adhesive 47, to the movable side walls 15. Said blocks 46 may be of glass or similar material, if desired. The edges of the glass top wall panels 18 may be provided with channeled metallic binding strips 48, if desired.

Secured to the end walls 10 at the bottom edges thereof are supporting members 49 for a tray-like member that has vertical end walls 50 and inclined longitudinally extending walls 51 that are arranged in V-shaped relation, and which may be formed of a single piece of material by providing a bend therein at 52, the members 49 being provided with cut-out portions that have inclined edges supporting the inclined walls 51. Vertically extending wall portions 53 extend upwardly from the wall portions 51 and may have inturned flanges 54 thereon. Thus a tank-like receptacle is provided that has a V-bottom.

An inner V-shaped bottom spaced from the V-bottom of said tank-like member is provided within said tank-like receptacle, comprising a perforated metallic wall 55 that has a large number of uniformly spaced perforations 56 therein, which are, preferably, circular openings, and which is spaced from the inclined walls 51 by means of spacing members 57 that are substantially of a Z-shape, and which have openings 58 for passage of liquid therethrough. Said perforated walls 55 extend parallel to the inclined walls 51 and the two inclined perforated walls 55 may be made of one piece of sheet metal by bending the same at 59. Said sheet metal member also, preferably, has upwardly extending flanges 60 that are secured in any suitable manner in fixed position on the vertically extending wall portions 53.

Mounted on the perforated wall having the inclined portions 55 is, preferably, a fine mesh screen member 61, which is substantially co-extensive with said inclined perforated walls 55. Mounted in the inner perforated container thus provided within the tank-like receptacle is a coarser screen member 62, which is made up of wires 63 and 64 that extend at right angles to each other and that are rather widely spaced so as to provide rectangular openings 65 that are adapted to serve as means through which the stem portions of plants are adapted to pass, the wires of the coarse screen 62 serving to hold said plants in position within a body of sand 66 or similar material provided in the inner receptacle that has the perforated bottom wall portion 61, the sand, preferably, extending considerably above the screen 62 to substantially the point at which the flanges 60 are turned up from the walls 55. Thus the screen member 62 serves to hold upright the plants that are located in the body of finely divided material, such as sand 66.

Figure 7:
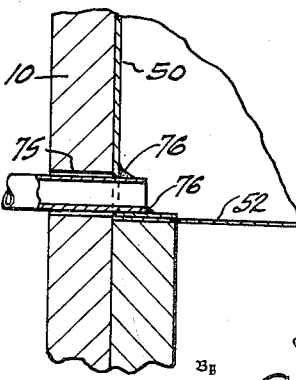
Fig. 7 is a view partly in vertical section and partly in elevation of a portion of the water supplying apparatus, on an enlarged scale.

Means is provided for supplying liquid to the tank-like member 51 and to maintain a predetermined level of liquid therein. The liquid is water in which suitable chemicals are dissolved to provide the proper type of nutrition for the plants that are to be grown in the finely divided material 66. A liquid reservoir 67 is provided, which is in the form of a jar or bottle, having the neck portion 68 thereof downwardly with the open mouth 69 thereof located in a pan-like member 70, which is mounted on a bracket 71 extending from one of the end walls 10. Suitable means, such as the flanges 72 on the bracket 71, are provided for holding the liquid container 67 with the mouth portion 69 thereof slightly spaced from the bottom wall of the pan-like member 70, so that air can enter the otherwise closed container 67 whenever the level of the water reaches below the open mouth 69, thus permitting some of the water, the level of which is indicated by the dotted line 73 in Fig. 1, to pass into the pan-like member 70 until the level again reaches above the mouth 69 of the bottle 67, whereupon the entrance of air to said bottle 67 will be sealed and no more liquid will flow therefrom until the level again drops. The water is also indicated in the pan 70 in Fig. 1 by the numeral 73, and it will be noted that the level of the water 73 in the pan 70 is the same as the level of the water in the tank having the V-bottom. This water level is maintained due to the conduit 74 which extends from the bottom of the pan 70 into the lower portion of the tank, extending through an opening 75 in the wall 10, as shown in Fig. 7, and into the bottommost portion 52 of the V-shaped bottom 51, being secured liquid tight to the vertical wall 50 of the tank where the same extends therethrough, by suitable means, such as solder 76.

Means is also provided for heating the liquid in the tank and thus the body of sand 66 and the air within the chamber above the level of the sand in the pan-like member, said means comprising an electrical heating element 77, which is of any well known character suitable for immersion in a liquid, and which is so constructed that the liquid is insulated from the electrical current supply for heating the element 77. Said heating element, preferably, extends longitudinally of the tank-like member within the same above the partition formed by the perforated wall 55 lying in the lower portion of said wall in the bottommost part of the body of sand 66, but considerably below the level of the liquid 73. Thus the heating element is located in the body of liquid and also in the body of finely divided material 66. Said heating element has an upturned portion 78, which is mounted in a suitable sleeve-like member 79 that is mounted on a suitable bracket 80 and which has electrical connections 81 at its upper end, one of which is shown in Fig. 1. Suitable means is provided for controlling the heating element 77 comprising a thermostatic element 82, which is provided with adjusting means 83 and which has a thermometer 84 mounted thereon that indicates the temperature of the air in the chamber within the housing. Thus the heating element can be regulated by the thermostat adjusting means 83 to maintain a desired temperature indicated by the thermometer 84 in the growing chamber within the housing.

Due to the body of water provided in the tank and the fact that said body of water is heated, a large amount of moisture will pass into the body of air within the growing chamber in the housing, and as it is quite likely that the walls 10 and 15 will be frequently cooler on the outside surface thereof than on the inner surface thereof, the high humidity within the growing chamber will cause condensation of moisture on the inside of the walls 10 and 15. It is desirable that this condensation be returned to the tank-like member and as substantially all of the condensation on the end walls 10 will pass down said walls and into the water pan along the end walls 50 thereof, it is not necessary to provide any means for returning this condensation to the water pan. However, as the side walls 15 are spaced from the side walls 53 of the tank, moisture condensed on said side walls will collect on the ledge 16 and accordingly trough-like members 85 are provided below and adjacent said ledges from which return pipes 86 extend across the air passage 87 through openings 88 in the walls 53 into said water tank, thus returning the condensation to the water tank.

It will be noted that an air passage is provided under each of the longitudinal frame members 11 running substantially the full length of the body portion of the growing apparatus, which communicates with the passages 87 on each side of the tank-like member in the lower portion of said apparatus, which passages 87 leads into the main body of air in the portion of the growing chamber above the tank that is located in the lower portion thereof. Thus there will be circulation of air around the plants growing within the chamber and constant communication with the outer air through said passages to a limited extent. Furthermore, when the temperature in the air chamber within the device reaches a predetermined level the bellows 40 will operate to open the ventilating means in the top of the chamber and this will cause a flow of air through the inlets below the walls 11 through the passages 87 into the main body of air within the chamber, and inasmuch as the temperature of the air externally of the growing chamber will normally be below that in the growing chamber, this will reduce the temperature within the growing chamber until the bellows 40 again acts to close the ventilating means.

The plant food elements that are dissolved in the water to form the growing solution that is supplied to the plants through the body of sand 66 are of a suitable character for the particular plants that are being grown and the concentration thereof and proportion thereof may be varied as may be found desirable. Said food elements ordinarily contain compounds of nitrogen, phosphorous, potassium, calcium, magnesium, sulphur, iron, boron, copper, manganese and zinc. The solution thus supplies the food elements for the plants and the proper humidified atmosphere therefor, and also the heating means provided in the body of solution provides the proper warmth for the loose material in which the plants are grown, as well as of the surrounding air.

What I claim is:

1. In an apparatus of the character described, a chamber having a liquid container therein, means within said container for mounting a body of loose material within said container, means for maintaining a body of liquid in said container in direct contact with said body of loose material and means in said container for heating said body of liquid.

2. In an apparatus of the character described, a chamber having a liquid container therein, means within said container for mounting a body of loose material within said container, means for maintaining a body of liquid in said container in direct contact with said body of loose material, means for heating said body of liquid, and means for controlling said liquid heating means to maintain a predetermined temperature in said chamber.

3. In an apparatus of the character described, a chamber having a liquid container in the lower portion thereof, a container for a body of loose material mounted within said liquid container, means for maintaining a body of liquid in said liquid container in direct contact with said body of loose material and means in said liquid container for heating said body of liquid.

4. In an apparatus of the character described, a chamber having light transmitting walls and having a liquid container therein, a container for a body of loose material mounted within said liquid container, means for maintaining a body of liquid in said liquid container in direct contact with said body of loose material and means for heating said body of liquid.

5. In an apparatus of the character described, a chamber having a liquid container in the lower portion thereof, a container for a body of loose material mounted within said liquid container, means for maintaining a body of liquid in said liquid container in contact with said loose material, said chamber having air passages leading from outside said chamber extending between opposite sides of said liquid container and the walls of said chamber.

6. In an apparatus of the character described, a chamber having a liquid container therein, means for maintaining a body of liquid in said container, a container for a body of loose material extending into said liquid container to an extent to maintain the lower portion of said body of loose material immersed in said body of liquid, and means in said liquid container for heating said body of liquid.

7. In an apparatus of the character described, a chamber having a liquid container therein, a container for a body of loose material mounted within said liquid container, means for maintaining a body of liquid in said liquid container in direct contact with said body of loose material, means for heating said body of liquid, temperature responsive means in said chamber controlling said liquid heating means, a vent in the upper portion of said chamber having a closure and temperature responsive means in said chamber controlling the position of said closure.

8. In an apparatus of the character described, a chamber having a liquid container therein, means within said container for mounting a body of loose material within said container, means for maintaining a body of liquid in said container in direct contact with said body of loose material, means for heating said body of liquid, and means for returning liquid condensed on the walls of said chamber to the body of liquid in said container.

9. In an apparatus of the character described a housing having a plurality of transparent walls, a tank mounted in the lower portion of said housing, means for supplying liquid to said tank to maintain a predetermined level of liquid therein, a perforated partition mounted within said tank and extending below said liquid level and a body of loose material mounted on said partition and extending above said liquid level.

10. In an apparatus of the character described, a housing having transparent walls, a tank mounted in the lower portion of said housing, means for supplying liquid to said tank to maintain a predetermined level of liquid therein, a perforated partition mounted within said tank spaced from the bottom thereof and extending below said liquid level, a fine mesh screen mounted on said partition, and loose material mounted on said partition and extending above said liquid level.

11. In an apparatus of the character described a housing having transparent walls, a tank mounted in the lower portion of said housing, means for supplying liquid to said tank to maintain a predetermined level of liquid therein, a perforated partition mounted within said tank spaced from the bottom thereof and extending below said liquid level, means in said tank for heating said liquid, temperature responsive means for controlling operation of said heating means, and loose material mounted on said partition and extending above said liquid level.

12. In an apparatus of the character described a housing having transparent walls, a tank narrower than said housing mounted in the lower portion of said housing, means for supplying liquid to said tank to maintain a predetermined level of liquid therein, a perforated partition mounted within said tank spaced from the bottom thereof and extending below said liquid level, said housing having openings in the lower portion thereof, and there being air passages between the side walls of said housing and said tank, and loose material mounted on said partition and extending above said liquid level.

13. In an apparatus of the character described a housing having transparent walls, a tank narrower than said housing mounted in the lower portion of said housing, means for supplying liquid to said tank to maintain a predetermined level of liquid therein, a perforated partition mounted within said tank and extending below said liquid level, said housing having openings in the lower portion thereof, and there being air passages between the side walls of said housing and said tank, venting means in the upper portion of said housing, temperature responsive means controlling said venting means, and loose material mounted on said partition and extending above said liquid level.

14. In an apparatus of the character described a housing having transparent walls, a tank narrower than said housing mounted in the lower portion of said housing, means for supplying liquid to said tank to maintain a predetermined level of liquid therein, a perforated partition mounted within said tank spaced from the bottom thereof and extending below said liquid level, means in said tank for heating said liquid, temperature responsive means controlling operation of said heating means, said housing having openings in the lower portion thereof, and there being air passages between the side walls of said housing and said tank, venting means in the upper portion of said housing, temperature responsive means controlling said venting means, and loose material mounted on said partition and extending above said liquid level.

15. In an apparatus of the character described a housing having transparent walls, a tank having a V-shaped bottom wall mounted in the lower portion of said housing, means for supplying liquid to said tank to maintain a predetermined level of liquid therein, a perforated V-shaped partition mounted within said tank in spaced relation to said V-shaped bottom and having a portion thereof extending below said liquid level, a fine mesh screen overlying said partition, and loose material mounted on said partition and extending above said liquid level.

16. In an apparatus of the character described a portable housing having transparent wall portions, a tank mounted in the lower portion of said housing, means for supplying liquid to said tank to maintain a predetermined level of liquid therein, a perforated partition mounted within said tank spaced from the bottom thereof and extending below said liquid level, troughs adjacent the side walls of said housing, liquid return conduits extending from said troughs to said tank, and loose material mounted on said partition and extending above said liquid level.

17. In an apparatus of the character described a portable housing having transparent wall portions, including transparent side walls mounted in said housing for vertical sliding movement and transparent top walls adjacent said side walls, sealing means between said side and top walls, a tank mounted in the lower portion of said housing, means for supplying liquid to said tank to maintain a predetermined level of liquid therein, a perforated partition mounted within said tank and extending below and above said liquid level and loose material mounted on said partition and extending below and above said liquid level.

18. In an apparatus of the character described a portable housing having transparent wall portions, a tank mounted in the lower portion of said housing, means for supplying liquid to said tank to maintain a predetermined level of liquid therein, a perforated partition mounted within said tank spaced from the bottom thereof and extending below said liquid level, a fine mesh screen mounted on said partition, loose material mounted on said partition and extending above said liquid level, and a reticulated member having widely spaced transverse and longitudinal members embedded in said loose material above said liquid.

JOSEPH G. THOMAS.

REFERENCES CITED

The following references are of record in the file of this patent:

UNITED STATES PATENTS

| Number | Name | Date |
|---|---|---|
| 374,499 | Siem | Dec. 6, 1887 |
| 1,954,674 | Lager | Apr. 10, 1934 |
| 2,051,461 | Lee | Aug. 18, 1936 |
| 2,121,461 | Widmann | June 21, 1938 |
| 2,306,027 | Swaney | Dec. 22, 1942 |
| 2,316,309 | Blain | Apr. 13, 1943 |
| 2,486,512 | Armstrong | Nov. 1, 1949 |

FOREIGN PATENTS

| Number | Country | Date |
|---|---|---|
| 70,858 | Germany | Sept. 1, 1893 |

OTHER REFERENCES

Eaton, "Large Sand Culture Apparatus," published 1931 in Soil Science, vol. 31, pages 235–241.